US009775138B1

(12) United States Patent
Lei

(10) Patent No.: US 9,775,138 B1
(45) Date of Patent: Sep. 26, 2017

(54) MECHANISM FOR MOVEABLE TELEMATICS SERVICES

(71) Applicant: FORD GLOBAL TECHNOLOGIES, LLC, Dearborn, MI (US)

(72) Inventor: Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/148,152

(22) Filed: May 6, 2016

(51) Int. Cl.
*H04W 72/04* (2009.01)
*H04B 1/08* (2006.01)
*H04B 1/3816* (2015.01)

(52) U.S. Cl.
CPC ........ *H04W 72/0406* (2013.01); *H04B 1/082* (2013.01); *H04B 1/3816* (2013.01)

(58) Field of Classification Search
None
See application file for complete search history.

(56) References Cited

U.S. PATENT DOCUMENTS

| 6,748,244 | B2 | 6/2004 | Odinak |
| 2015/0230277 | A1 | 8/2015 | O'Meara et al. |
| 2015/0288677 | A1 | 10/2015 | Chun |
| 2015/0382165 | A1 | 12/2015 | Lorello et al. |
| 2016/0328244 | A1* | 11/2016 | Ahmed ................. G06F 9/4443 |
| 2016/0342406 | A1* | 11/2016 | Ahmed ................. G06F 9/4443 |

OTHER PUBLICATIONS

Hack #45. Forward Your Home Calls to Your Cell PHone—VoIP Hacks [Book]. Retrieved from https://www.safaribooksonline.com/library/view/voiphacks/0596101333/ch04s06.html on Jan. 12, 2016.

* cited by examiner

*Primary Examiner* — Diane Mizrahi
(74) *Attorney, Agent, or Firm* — Jennifer M. Stec; Brooks Kushman P.C.

(57) ABSTRACT

A telematics control unit in a vehicle, comprising a processor configured to send to a telematics server account data of a cellular account of a driver of the vehicle and a request to affiliate the account data with the telematics control unit, and in response to sending a request to the server to bridge an incoming call to a virtual number of the driver, output the bridged call using a computer system of the vehicle.

20 Claims, 3 Drawing Sheets

MECHANISM FOR MOVEABLE TELEMATICS SERVICES

TECHNICAL FIELD

Aspects of the disclosure relate to vehicles that include multimedia systems with a telematics control unit.

BACKGROUND

Vehicles may come equipped with telematics units. A driver of vehicle may also have a mobile phone that may interact with a vehicle computer system. Furthermore, the driver may have a cellular account or virtual number that is not affiliated with a telematics unit.

SUMMARY

A first illustrative embodiment discloses a vehicle computer system, comprising a telematics control unit configured to communicate with a remote server. The vehicle computer system further comprises a processor in the telematics control unit configured to send, to the server, telematics control unit identification data, and cellular account data affiliated with a user, but not affiliated with the telematics control unit, request the server to affiliate the cellular account data with the telematics control unit; and receive from the server an incoming call at a virtual number, wherein the incoming call is output by the telematics control unit at the vehicle computer system; and provide cellular data services (e.g. Internet, SMS, etc.) associated with the cellular account via telematics control unit to the user.

A second illustrative embodiment discloses a server, comprising a processor configured to receive telematics control unit identification data and cellular account data from a telematics control unit of a vehicle, wherein the cellular account data is affiliated with a user, but not affiliated with the telematics control unit. The processor is further configured to affiliate the telematics control unit with the cellular account data, receive a call at a virtual number at the server and bridge the call to the telematics control unit utilizing the account data; and send the bridged call to the telematics control unit.

A third illustrative embodiment discloses a telematics control unit in a vehicle, comprising a processor configured to send to a telematics server account data of a cellular account of a driver of the vehicle and a request to affiliate the account data with the telematics control unit, and in response to sending a request to the server to bridge an incoming call to a virtual number of the driver, output the bridged call using a computer system of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
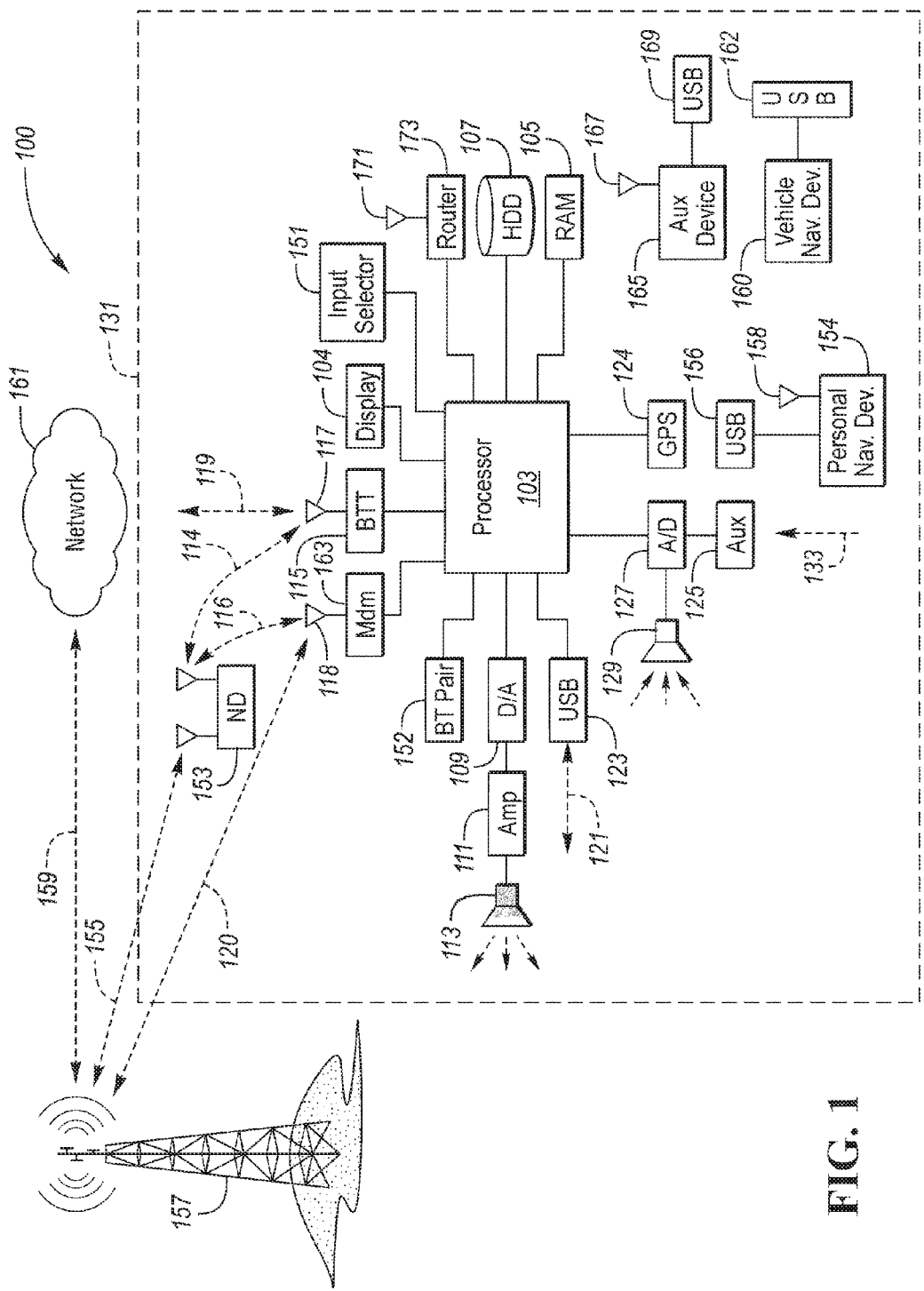
FIG. 1 is an example block topology illustrating a vehicle based computing system for a vehicle.

FIG. 1 illustrates an example block topology for a vehicle-based computing system 100 (VCS) for a vehicle 131. An example of such a VCS 100 is the FORD SYNC system manufactured by FORD MOTOR COMPANY. A vehicle 131 enabled with the VCS 100 may contain a visual front-end interface 104 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment shown in FIG. 1, a processor 103 controls at least some portion of the operation of the VCS 100. Provided within the vehicle, the processor allows onboard processing of commands and routines. Further, the processor is connected to both non-persistent 105 and persistent storage 107. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 129, an auxiliary input 125 (for input 133), a USB input 123, a GPS input 124 and a BLUETOOTH input 115 are all provided. An input selector 151 is also provided, to allow a user to select between various inputs. Input to both the microphone and the auxiliary connector is converted from analog to digital by a converter 127 before being passed to the processor. Although not shown, these and other components may be in communication with the VCS 100 over a vehicle multiplex network (such as, but not limited to, a CAN bus) to pass data to and from the VCS 100 (or components thereof).

Outputs to the system can include, but are not limited to, a visual display 104 and a speaker 113 or stereo system output. The speaker is connected to an amplifier 111 and receives its signal from the processor 103 through a digital-to-analog converter 109. Output can also be made to a remote BLUETOOTH device such as PND 154 or a USB device such as vehicle navigation device 160 along the bi-directional data streams shown at 119 and 121 respectively.

In one illustrative embodiment, the VCS 100 uses the BLUETOOTH transceiver 115 to communicate 117 with a user's nomadic device 153 (e.g., wearable device, cell phone, smart phone, PDA, tablet, a device having wireless remote network connectivity, etc.). The nomadic device (ND) can then be used to communicate 159 with a network 161 outside the vehicle 131 through, for example, communication 155 with a cellular tower 157. In some embodiments, tower 157 may be a WiFi access point.

Exemplary communication between the nomadic device and the BLUETOOTH transceiver is represented by signal 114.

Pairing a nomadic device 153 and the BLUETOOTH transceiver 115 can be instructed through a button 152 or similar input. Accordingly, the CPU is instructed that the onboard BLUETOOTH transceiver will be paired with a BLUETOOTH transceiver in a nomadic device. Additionally, the vehicle can pair or connect to a Wi-Fi access point utilizing similar input.

Data may be communicated between processor 103 and network 161 utilizing, for example, a data-plan, data over voice, or DTMF tones associated with nomadic device 153. The nomadic device 153 can then be used to communicate with a network 161 outside the vehicle 131 through, for example, communication 155 with a cellular tower 157. In some embodiments, the modem 163 may establish communication 120 with the tower 157 for communicating with network 161. As a non-limiting example, modem 163 may be a USB cellular modem and communication 120 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 153 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 103.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 megabytes for stationary or walking users and 385 kbs for users in a moving vehicle. 3G standards are now being replaced by IMT-Advanced (4G) which offers 100 mbs for users in a vehicle and 100 gbs for stationary users. If the user has a data-plan associated with the nomadic device, it is possible that the data-plan allows for broad-band transmission and the system could use a much wider bandwidth (speeding up data transfer). In still another embodiment, nomadic device 153 is replaced with a cellular communication device (not shown) that is installed to vehicle 131. In yet another embodiment, the nomadic device (ND) 153 may be a wireless local area network (LAN) device capable of communication over, for example (and without limitation), an 802.11g network (i.e., WiFi, or other standards such as 802.11 a, b, n, ac, p or other future standards) or a WiMax network. The vehicle may also include its own WiFi router to connect to a wireless access point.

Additional sources that may interface with the vehicle include a personal navigation device 154, having, for example, a USB connection 156 and/or an antenna 158, a vehicle navigation device 160 having a USB 62 or other connection, an onboard GPS device 124, or remote navigation system (not shown) having connectivity to network 161. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the processor 103 could be in communication with a variety of other auxiliary devices 165. These devices can be connected through a wireless 167 or wired 169 connection. Auxiliary device 165 may include, but are not limited to, personal media players, wireless health devices, portable computers, nomadic devices, key fobs and the like.

Also, or alternatively, the CPU could be connected to a vehicle-based wireless router 173, using for example a WiFi (IEEE 803.111) 171 transceiver. This could allow the CPU to connect to remote networks in range of the local router 173.

In addition to having exemplary processes executed by a VCS 100 located in a vehicle 131, in certain embodiments, the exemplary processes may be executed by a computing system in communication with the VCS 100. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply particular VACS to a given solution. In all solutions, it is contemplated that at least the VCS 100 located within the vehicle 131 itself is capable of performing the exemplary processes.

Figure 2:
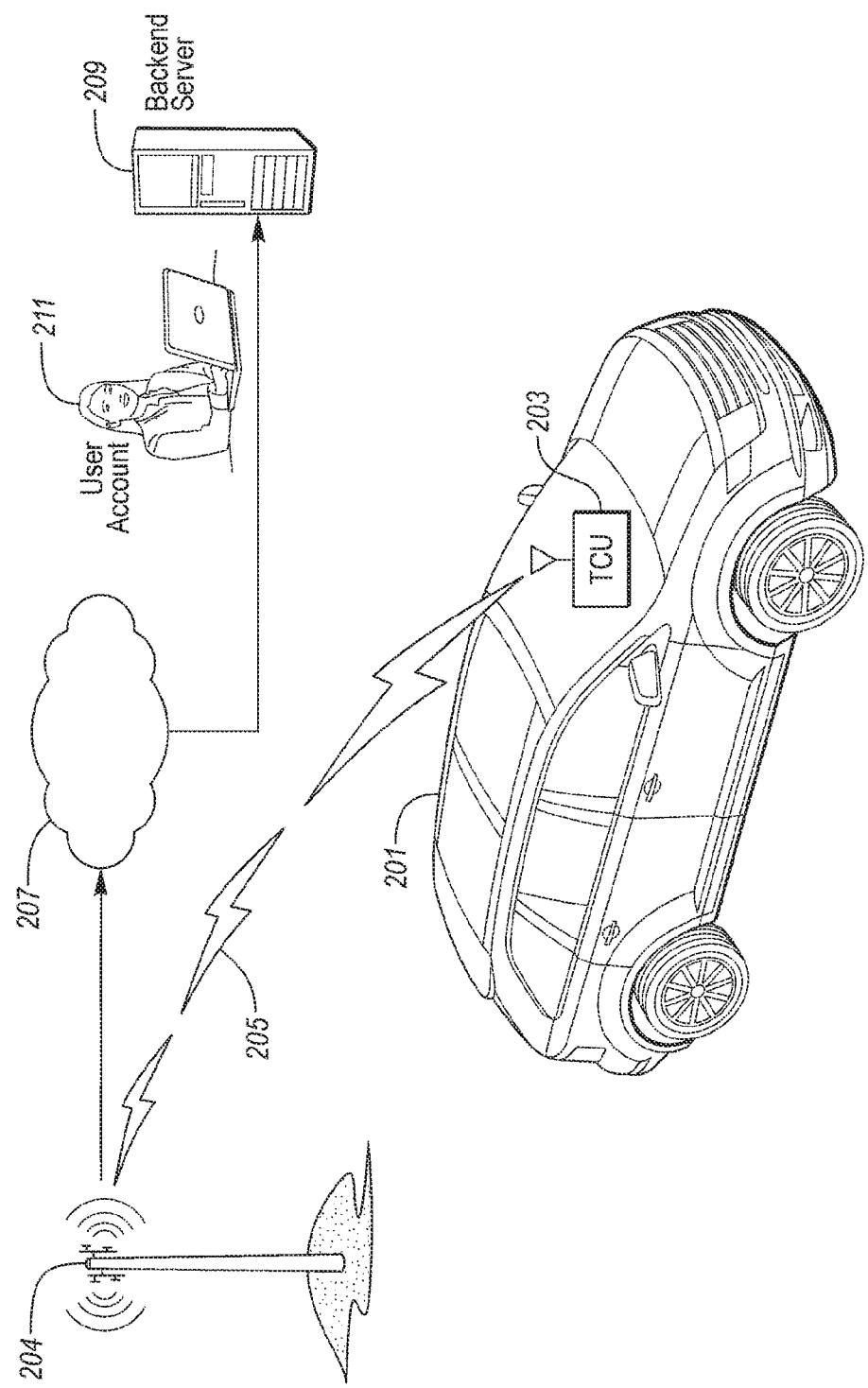
FIG. 2 is an illustrative topology of a vehicle interacting with a telematics server.

FIG. 2 discloses an illustrative topology of a vehicle interacting with a back-end server (or similar telematics server). A vehicle 201 may be a secondary vehicle that is not a driver or user's primary vehicle. For example, the vehicle 201 may include a rental vehicle, a secondary vehicle in the house (e.g., spouse's vehicle, second car, child's car, etc.), friend's car, etc. The vehicle 201 may be equipped with an embedded telematics control unit (TCU) 203. The TCU may be configured to access a telecommunications network for purposes of making cellular phone calls and utilizing cellular data services to exchange data and packets of data. The TCU 203 may already have a dedicated phone number associated with it and cellular services. The cellular services provided by the TCU could be fully functional in some circumstances. In other circumstances, the TCU could allow only for basic cellular services until a user's cellular account is associated with the TCU. For example, the TCU may provide an internet connection only to allow a user to log into the user's account to associate the user's cellular account The phone number associated with the TCU 203 may utilize a different phone number than that of a driver's cellular phone, a driver's telematics system in their own vehicle, or a driver's virtual number (for example, a user's direct inward dial number, an access number, or any number that may be without a directly associated telephone line). The virtual number may be preprogrammed to forward incoming calls to one of the pre-set telephone numbers chosen by a user, either a fixed number, a mobile number, or a voice over internet-protocol (VoIP) number. Virtual numbers may allow subscribers to use their existing phones without the need to purchase additional hardware. Some examples of virtual phone numbers include Google Voice or other virtual number providers. In other examples, the TCU 203 of the secondary vehicle may have no association with a cellular plan or data plan that is typically utilized by the driver of the vehicle 201.

The TCU 203 may communicate with a cellular antenna 204 utilizing wireless signal 205. The wireless signal 205 may be utilized to communicate vehicle data from the vehicle 201 to remote servers. Furthermore, the wireless signal 205 may be utilized to communicate off-board data to the vehicle 201. The TCU 203 may communicate with the "cloud" server 207 (or similar network) utilizing the cellular antenna 204. The cloud 207 may be in further communication or include a backend server 209. The backend server 209 may have information related to the TCU 203 or the user's cellular account data 211. The user's cellular account data 211 may be sent from the vehicle 201 to be stored on the backend server 209. The server 209 may also be in communication with other networks and servers to receive information to facilitate in associating the TCU with an account of the user, such as a cellular provider server that includes information related to a user's cellular account, or a server that includes information related to a user's virtual number account. For example, a server or network may be in communication with another server or network that is operated by a cellular services provider to exchange data related to the user's cellular account. The cloud server 207 or backend server 209 may also receive information regarding the TCU 203, which may include hardware identification numbers, electronic serial numbers (ESN) of the TCU, a phone number associated with the TCU, a cellular provider of the TCU, etc.

Figure 3:
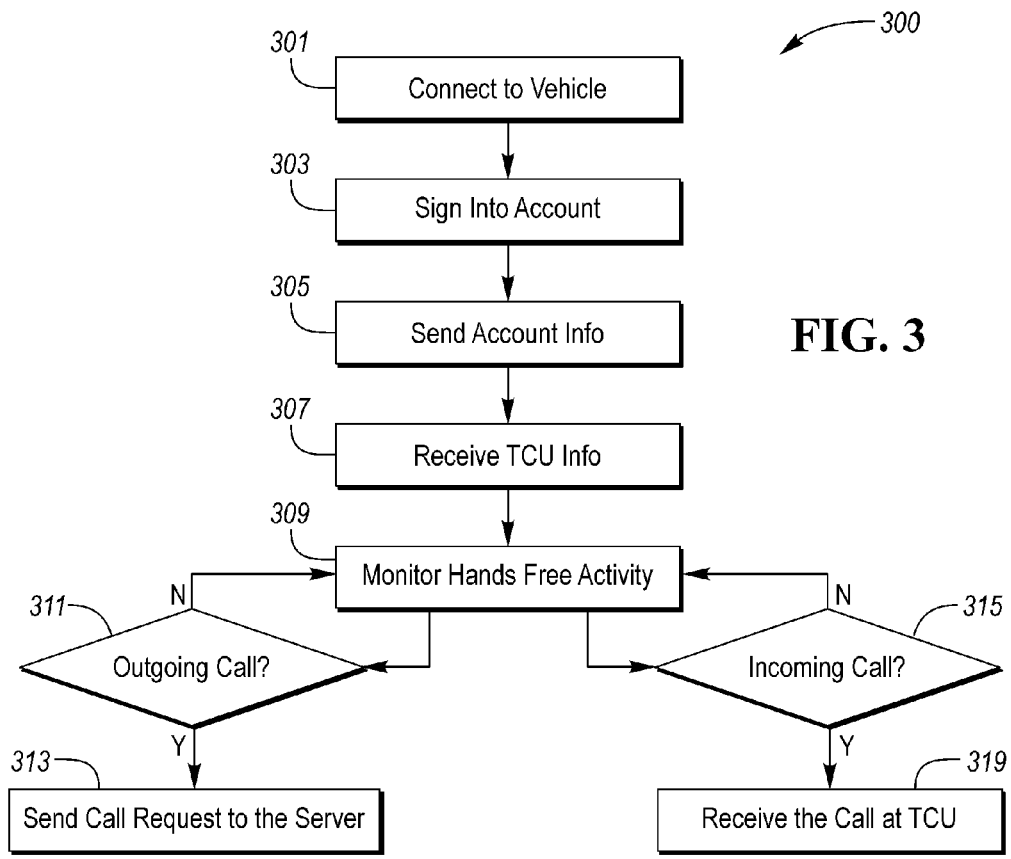
FIG. 3 is a flowchart illustrating operation of a vehicle interacting with a telematics server.

FIG. 3 is an illustrative flow chart 300 of a VCS that may be used in a vehicle interacting with a telematics server. A user may enter into a rental vehicle or another vehicle that the user has never used before, as well as a user's own vehicle. The user may connect his mobile phone or other nomadic device to that vehicle at 301, although it is not required. The user may have a cellular account that has specified rates as related to using the voice and data services of its cellular provider.

The user may sign into his account from the TCU 203 of the rental vehicle at 303. The TCU 203 may provide for a basic connection (e.g. limited access to an off-board network that may not charge a user for service) to the cloud or to an off-board server. Using the basic connection, the VCS may allow a user to log into an account associated with his or her cellular services or virtual number within the secondary vehicle. The VCS and TCU 203, in connection with the backend server 209, may exchange information when a connection is made between the TCU 203 of the vehicle and any of the servers, for instance after logging into an account of the TCU 203 using the VCS. Information that may be exchanged includes data indicative of the cellular provider's account information, name of user, virtual phone number, data plans, voice plans, etc. The cellular account data and the TCU information may be exchanged with the backend server as well.

The VCS may utilize the TCU 203 to send cellular account data indicating the user's cellular account information at 305. The backend server may utilize the cellular account data (e.g., TCU's phone number, serial number, etc.) received from the TCU to facilitate in performing the affiliation. The backend server may have access or be in communication to a database that includes data indicating account information or data related to the virtual number of the user. The backend server may affiliate the user's cellular account information (e.g., cellular account number or other information used on a subscriber identity module (SIM) card) or the user's virtual number to the TCU's telematics information to provide ownership of the TCU to the user. The temporary affiliation of the TCU may be applied by the backend server for a predefined period of time that will expire after the predefined period of time has elapsed. By affiliating the TCU with the user's cellular account data, a user may operate the TCU utilizing a cellular accounts voice or data plan, or other services associated with the user's cellular account. The predefined time to affiliate the TCU with the cellular account of the user may be defined by a user interface of the vehicle computer system or include a default setting (e.g., expire after ignition off, expire after a predefined amount of hours, expire after a predefined amount of days, etc.). Thus, the TCU may be utilized according to the terms of the user's cellular account. For example, the TCU may be associated with a phone number (e.g., (313) 999-6789), and a user's cellular account may be associated with a virtual phone number (e.g., (248) 123-4567). The server may affiliate the cellular account phone number with the TCU's phone number to allow the TCU to temporarily provide ownership to the user utilizing the cellular account when providing a physical connection.

The vehicle computer system may receive TCU information data including a unique identifier of the telematics control unit at 307. As some examples, the vehicle computer system may receive data indicating a phone number of the TCU, a media access control (MAC) address of the TCU, or other data utilized to uniquely identify the TCU or an account associated with the TCU. The vehicle computer system may also send the TCU data to the backend server, to which the TCU may utilize for affiliating the TCU with the cellular account.

The VCS may monitor hands-free activity in the vehicle at 309. The VCS may therefore monitor any incoming calls to the TCU communicating with the VCS or the any outgoing calls of the TCU communicating with the VCS. Other activity may include incoming texts or short message service (SMS) messages, social media posts or messages, video-conferencing, etc.

While monitoring the hands-free call activity, the VCS may specifically determine if an outgoing call has been made at 311. The VCS may make the phone call utilizing the TCU. In one example, the user may make an outgoing hands-free call to a friend's phone number (e.g., (CCC) XXX-XXXX). The TCU may utilize the TCU phone number (e.g., (313) 999-6789) to make the physical connection to the server. At 313, the vehicle computer system may send a call request to the server in order to utilize the account information when making the outgoing call. The backend server may receive the call request and make a call from the cellular account virtual phone number (e.g., (248) 123-4567) to the friend's phone number (e.g., (CCC) XXX-XXXX). The backend server may then bridge the two calls together. Despite the outgoing call being requested by the TCU utilizing the TCU's phone number, the recipient of the outgoing call may see the cellular account virtual phone number (e.g., (248) 123-4567) as being originating phone number of the call, which is recognizable, rather than the TCU's phone number (e.g., (313) 999-6789).

The VCS may also monitor whether an incoming call has been received at 315. The VCS may receive an incoming call at the mobile device in communication with the VCS, receive an incoming call at a virtual number, or receive an incoming call at the TCU. In one example, the user may receive an incoming call from a friend's phone number (e.g., (CCC) XXX-XXXX) to the virtual number (e.g., (248) 123-4567). The server may forward the incoming call to the TCU's phone number (e.g., (313) 999-6789), and the calls is received at the TCU at 319. The user in the vehicle will be able to view his friend's phone number (e.g., (CCC) XXX-XXXX) in the vehicle utilizing the VCS that may output it at a vehicle display. The TCU may be able to receive the friend's phone number by configuring the server to forward all incoming calls to the TCU. The TCU may communicate with the VCS to output the caller identification information to an HMI module or user interface with a display.

The VCS may also monitor cellular data services activity from the user in the vehicle. The user may use his mobile phone to connect to the TCU via a WiFi connection. The TCU connects to the backend server and/or the Internet using the user's account data. All the data usage may be charged to the user's cellular account upon affiliating the TCU with the user's account.

Figure 4:
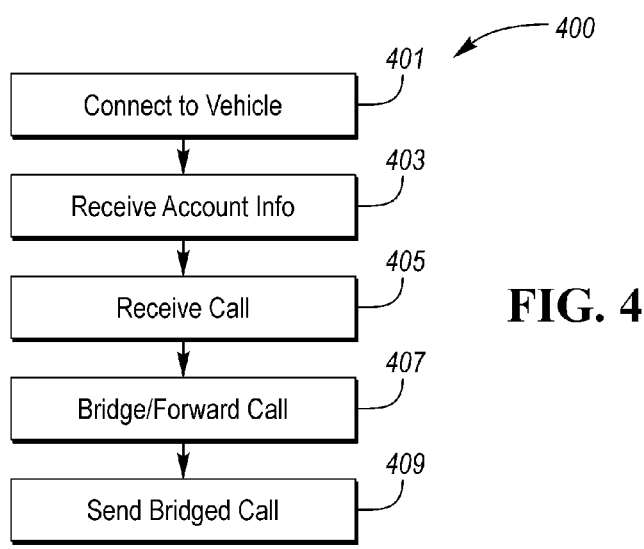
FIG. 4 is a flowchart illustrating operation of a server interacting with a vehicle.

FIG. 4 is an illustrative topology of a flow chart 400 of a back-end server or telematics server 209 that may be used to interact with a TCU 203 of a vehicle. The server 209 may be connected to the vehicle 201 that utilizes a TCU 203 at 401. Upon establishing a connection with the vehicle 201, the server 209 may be able to communicate data and other information to the vehicle, as vice versa. The server 209 may also receive vehicle information or vehicle data, including information related to the TCU, VIN number of the vehicle, and other similar information.

The server 209 may receive various account data from the vehicle 201 at 403. The account data may include information that indicates requisite information associated with the user's cellular account number or virtual number. That information may be utilized by the server to later associate the cellular account or virtual number with the TCU of the vehicle.

The server 209 may also receive a call at 405. The server may either receive an outgoing call that the vehicle makes, or the server may receive an incoming call to the vehicle. Then, the server bridges the outgoing call received from the vehicle with a new call initiated by the virtual number at 407, or the server forwards the incoming call to the TCU. The server 209 may then send the bridged call back to the vehicle 201 at 409.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle computer system, comprising:
a telematics control unit (TCU) configured to communicate with a remote server; and
a processor configured to:
send, to the server, TCU identification data, and cellular account data affiliated with a user, but not affiliated with the TCU;
request the server to affiliate the cellular account data with the TCU; and
receive from the server an incoming call at a virtual number, wherein the incoming call is output by the TCU at the vehicle computer system.

2. The vehicle computer system of claim 1, wherein the TCU identification data includes parameters indicating one or more of a serial number of the TCU, a TCU phone number, or a TCU cellular provider.

3. The vehicle computer system of claim 1, wherein the account data includes parameters indicating at least one of an owner of the cellular account, a virtual phone number affiliated with the cellular account, or a network subscriber of the cellular account.

4. The vehicle computer system of claim 1, wherein the processor is further configured to receive the cellular account data affiliated with a user from a human machine interface of the vehicle computer system.

5. The vehicle computer system of claim 1, wherein the account data is associated with the TCU for a predefined time.

6. The vehicle computer system of claim 1, wherein the account data is affiliated with the TCU until an ignition off.

7. The vehicle computer system of claim 1, wherein the processor is further configured to initiate an outgoing call utilizing the TCU and the account data.

8. The vehicle computer system of claim 1, wherein the processor is further configured to send caller identification information affiliated with the cellular account.

9. The vehicle computer system of claim 1, wherein the account data is further affiliated with a virtual phone number.

10. A server, comprising:
a processor configured to:
receive telematics control unit (TCU) identification data and cellular account data from a TCU of a vehicle, wherein the cellular account data is affiliated with a user, but not affiliated with the TCU;
affiliate the TCU with the cellular account data;
receive a call at a virtual number at the server and bridge the call to the TCU utilizing the account data; and
send the bridged call to the TCU.

11. The server of claim 10, wherein the processor is further configured to receive a request to affiliate the TCU with the cellular account data for a predefined time.

12. The server of claim 11, wherein the processor is further configured to discontinue the affiliation of the TCU with the cellular account data after a predefined time.

13. The server of claim 10, wherein the processor is further configured to receive from the TCU an outgoing call to a phone number;
dial the phone number utilizing the account data and bridge the outgoing call received from the TCU; and
send the bridged outgoing call to the TCU.

14. The server of claim 10, wherein the server is configured to send outgoing call data indicating a caller identification of the user.

15. The server of claim 10, wherein the TCU identification data includes parameters indicating a serial number of the TCU, a TCU phone number, or a TCU cellular provider.

16. The server of claim 10, wherein the cellular account data includes information associated with a subscriber identity module (SIM) card of the user.

17. A telematics control unit (TCU) in a vehicle, comprising:
a processor configured to send to a telematics server account data of a cellular account of a driver of the vehicle and a request to affiliate the account data with the TCU, and in response to sending a request to the server to bridge an incoming call to a virtual number of the driver, output the bridged call using a computer system of the vehicle.

18. The telematics control unit (TCU) in a vehicle of claim 17, wherein the processor is further configured to utilize the account data upon outputting the bridged call.

19. The telematics control unit (TCU) in a vehicle of claim 17, wherein the processor is further configured to affiliate the account data with the TCU for a predefined time.

20. The telematics control unit (TCU) in a vehicle of claim 19, wherein the processor is further configured to terminate affiliation of the account data with the TCU upon the predefined time lapsing.

* * * * *